(12) United States Patent
Radermacher (10) Patent No.: US 9,986,604 B2
(45) Date of Patent: May 29, 2018

(54) DRIVER ARRANGEMENT (71) Applicant: PHILIPS LIGHTING HOLDING B.V., Eindhoven (NL)

(72) Inventor: Harald Josef Gunther Radermacher, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 15/120,514

(22) PCT Filed: Feb. 25, 2015

(86) PCT No.: PCT/EP2015/053952
§ 371 (c)(1),
(2) Date: Aug. 19, 2016

(87) PCT Pub. No.: WO2015/128388
PCT Pub. Date: Sep. 3, 2015

(65) Prior Publication Data
US 2016/0366732 A1 Dec. 15, 2016

(30) Foreign Application Priority Data

Feb. 26, 2014 (EP) .................................... 14156792

(51) Int. Cl.
H05B 37/02 (2006.01)
H05B 33/08 (2006.01)
(52) U.S. Cl.
CPC ..... *H05B 33/0812* (2013.01); *H05B 33/0815* (2013.01); *H05B 33/0845* (2013.01); *H05B 33/0887* (2013.01); *Y02B 20/343* (2013.01)

(58) Field of Classification Search
CPC ............ H05B 33/0815; H05B 33/0845; H05B 33/0812; H05B 33/0887
(Continued)

(56) References Cited

U.S. PATENT DOCUMENTS 6,462,972 B2   10/2002   Nagai et al.
7,531,922 B1    5/2009   Olson
(Continued)

FOREIGN PATENT DOCUMENTS

DE   102011015282 A1   10/2012
DE   202014009848 U1    3/2015
(Continued)

*Primary Examiner* — Douglas W Owens
*Assistant Examiner* — Amy Yang
(74) *Attorney, Agent, or Firm* — Akarsh P. Belagodu (57) ABSTRACT The invention describes a driver arrangement (1) for driving a semiconductor lighting load (2), which driver arrangement (1) comprises a first power converter (10) arranged to drive a portion (2_10, 2_10_11) of the lighting load (2); a second power converter (11) arranged to drive a portion (2_11, 2_10_11) of the lighting load (2); a monitoring arrangement (12) realized to monitor an operating characteristic (12A, 12B, 12C, $I_{R3O}$) °f the second power converter (11); and a control signal generator (13) for generating a control signal (130, $V_{shunt}$) for the first power converter (10) on the basis of the monitored operating characteristic (12A, 12B, 12C, $I_{R3O}$). The invention also describes a lighting arrangement (100), which lighting arrangement (100) comprises a semiconductor lighting load (2); and such a driver arrangement (1) for driving the semiconductor lighting load (2). The invention also describes a method of driving a semiconductor lighting load (2).

14 Claims, 7 Drawing Sheets (58) Field of Classification Search
USPC .......................... 315/185 R, 291, 294, 200 R
See application file for complete search history.

(56) References Cited

U.S. PATENT DOCUMENTS

| | | | |
|---|---|---|---|
| 2002/0145392 A1* | 10/2002 | Hair, III ............. | H05B 33/0803 315/185 R |
| 2006/0181485 A1* | 8/2006 | Kim ................... | H05B 33/0812 345/46 |
| 2010/0013402 A1* | 1/2010 | Chaffai ............. | H05B 33/0815 315/291 |
| 2013/0057163 A1* | 3/2013 | Sutardja ............. | H05B 33/0857 315/185 R |
| 2014/0001969 A1 | 1/2014 | Tateishi et al. | |

FOREIGN PATENT DOCUMENTS

| | | |
|---|---|---|
| EP | 1691583 A2 | 8/2006 |
| EP | 1986470 A2 | 4/2007 |
| WO | WO2007023454 A1 | 3/2007 |
| WO | WO2008110990 A1 | 9/2008 |
| WO | WO2010103480 A2 | 9/2010 |
| WO | WO2012137103 A1 | 10/2012 |
| WO | WO2013090945 A1 | 12/2012 |
| WO | WO2013028632 A1 | 2/2013 |
| WO | WO2013087381 A1 | 6/2013 |
| WO | WO2013093708 A1 | 6/2013 |

* cited by examiner

DRIVER ARRANGEMENT

CROSS-REFERENCE TO PRIOR APPLICATIONS

This application is the U.S. National Phase application under 35 U.S.C. § 371 of International Application No. PCT/EP2015/053952, filed on Feb. 25, 2015, which claims the benefit of European Patent Application No. 14156792.5, filed on Feb. 26, 2014. These applications are hereby incorporated by reference herein.

FIELD OF THE INVENTION

The invention describes a driver arrangement, a lighting arrangement, and a method of driving a semiconductor lighting load.

BACKGROUND OF THE INVENTION

Light-emitting diodes (LEDs) can be used in retro-fitting, i.e. replacing traditional light sources such as halogen, fluorescent, or incandescent light sources. The advantages of a retro-fit luminaire are that the lamp design remains essentially unchanged, and a significant reduction in power consumption is achieved. In order to use an LED light source (typically one or more strings of LEDs) in a "traditional" lamp, it must be adapted to existing design elements such as socket design, housing shape, etc. Furthermore, the traditional lamps were developed for different power supplies— incandescent lamps can be used with a mains power supply, while a halogen lamp generally requires a transformer to lower the supply voltage. A lighting load based on semiconductor devices such as LEDs requires a highly controllable driver or power converter such as a switched-mode power supply to provide the necessary input power to the semiconductor devices. The power converter is configured to meet the requirements of the lighting load. However, the developing, testing and manufacturing of a dedicated driver for each possible application—and for each possible power level in an application—is prohibitively cost-intensive. Furthermore, in order to be able to use LEDs to replace a certain type of traditional light source, i.e. to retrofit a traditional lamp with LEDs, the driver for the LEDs must be realized to fit into the existing housing and must be able to deal with the power supply for which that lamp was originally designed. Since the physical size of a driver such as a switched-mode power supply generally increases with increased power rating, lamps with different power ratings might require different-sized housings for their drivers. For example, the magnetic component (coil or transformer) of a switched-mode powers supply is typically quite large, and an increase in power level means an increase in the size of the magnetic component. These may not fit into the available space in certain lighting applications. The requirement to provide larger lamp housings to accommodate larger components significantly adds to the overall design cost of such lighting applications.

EP1691583 A1 discloses a LED driver for a lighting load. The lighting load comprises three single LEDs. The driver comprises a switch such that just one LED of the three LEDs is driven at a time. The driver comprises a switch mode driver and a linear mode driver and the two drivers provide in conjunction a single driver signal.

Therefore, it is an object of the invention to provide an improved driver design that overcomes the problems outlined above.

SUMMARY OF THE INVENTION

The object of the invention is achieved by the driver arrangement of claim 1; by the lighting arrangement of claim 11; and by the method of claim 15 of driving a semiconductor lighting load.

According to the invention, the driver arrangement is configured to drive a semiconductor lighting load that comprises a number of semiconductor light sources, and comprises a first power converter configured to drive at least a portion of the lighting load; a second power converter configured to drive at least a portion of the lighting load; a monitoring arrangement configured to monitor an operating characteristic of the second power converter; and a control signal generator configured to generate a control signal for the first power converter on the basis of the monitored operating characteristic. The first power converter is configured to drive at least a first portion of the light load and the second power converter is configured to drive a second portion of the light load.

In the context of the invention, the term "semiconductor light source" is to be understood to comprise a light source such as a light-emitting diode (LED), an organic light-emitting diode (OLED), a laser light source such as a vertical-cavity surface-emitting laser (VCSEL), etc., or any appropriate combination of such semiconductor light sources. Since a power converter in a lighting arrangement is used to drive the lighting load, the terms "power converter", "driver" and "driver stage" may be used interchangeably in the following.

An advantage of the driver arrangement according to the invention is that the first and second power converters act together to drive the lighting load in a more efficient manner from the point of view of design flexibility and cost than a prior art driving arrangement with only a single driver or a prior art driving arrangement with two cooperating drivers driving the entire lighting load, since the first power converter can be driven according to one or more operating characteristics of the second power converter. For example, the first power converter can be a favorably power-efficient and controllable driver such as a switched-mode power supply and may be regarded as the "main driver", while the second power converter may be a more simple and economical, but less efficient and less controllable driver, and may be regarded as an "auxiliary driver" that assists the main driver. Since the total power to the lighting load can be provided by these two power converters, the first power converter does not have to supply the entire power to the lighting load, and may therefore be "smaller" and more economical than an equivalent single driver for that lighting load. Furthermore, the second power converter can be used to adjust the overall power provided to the lighting load so that one type of driver arrangement can be used to drive lighting loads with different power ratings. In this way, the driver arrangement according to the invention provides a favorably scalable power supply for a semiconductor lighting load.

According to the invention, the lighting arrangement comprises a semiconductor lighting load and such a driver arrangement for driving the semiconductor lighting load.

An advantage of the lighting arrangement according to the invention is that the combined cost of the first and second power converters is less than the portfolio of equivalent single main drivers that would be required in a prior art arrangement for driving a range of different lighting loads. This can favorably reduce the production costs of a luminaire comprising such a lighting arrangement. Furthermore, since a main driver is generally quite bulky, the combination of a smaller first power converter with the second power converter for augmenting the first power converter results in a combined driver arrangement that takes up less room than an equivalent driver of a prior art arrangement, so that the lighting arrangement according to the invention provides a simple and economical solution that overcomes the problem of costly design requirement, for example to accommodate large magnetic components as described above. The advantage of the more compact driver is that the overall luminaire can be smaller, and/or the luminaire may be realized to have a larger light-emitting area, as will be explained below.

According to the invention, the method of driving a semiconductor lighting load comprises the steps of arranging a first power converter to drive a portion of the lighting load; arranging a second power converter to drive a portion of the lighting load; monitoring an operating characteristic of the second power converter; and generating a control signal for the first power converter on the basis of the monitored operating characteristic. The first power converter being configured to drive at least a first portion of the lighting load and the second power converter being configured to drive a second portion of the lighting load.

An advantage of the method according to the invention is that the lighting load can be driven in a more efficient manner than in a prior art approach, since the lighting load can be driven mainly by the first power converter, and the performance of the first power converter can be augmented as required by the second power converter. As indicated above, the first power converter can be a high-performance and more complex driver, while the second power converter can be simpler in design, and taken together, these power converters can efficiently and reliably drive the lighting load while being more economical to realize.

The dependent claims and the following description disclose particularly advantageous embodiments and features of the invention. Features of the embodiments may be combined as appropriate. Features described in the context of one claim category can apply equally to another claim category.

In the following, without restricting the invention in any way, it may be assumed that the semiconductor lighting load comprises a plurality of LEDs, and that a "portion" of the lighting load comprises any number of LEDs connected in any suitable manner, for example in series and/or in parallel. Of course, a lighting load "portion" can comprise the entire lighting load. A lighting load or a lighting load portion may be referred to in the following as a "light engine".

Preferably, the semiconductor lighting load of the lighting arrangement according to the invention comprises at least one LED string, wherein an LED string is arranged to be driven by a power converter of the driver arrangement, as will become clear in the following.

As indicated above, the first power converter is a driver with a high degree of controllability. Various types of controllable drivers are available for driving a load comprising one or more semiconductor light sources. However, it is preferable to choose a driver that has a high degree of efficiency. Preferably, therefore, the first power converter comprises a switched-mode power supply (SMPS) realized in the form of a step-up or boost converter. Such a driver is characterized by a high power factor, and may even have a power factor that is close to unity. The first power converter therefore ensures a favorable power factor for the overall driving arrangement. A driver such as an SMPS can also deal with (i.e. compensate) mains voltage fluctuation, LED string voltage changes, etc. For example, for a lighting arrangement to be connected to the mains power supply, an SMPS driver can adjust its input power consumption over time so that the total power consumption satisfies mains harmonics regulation as laid down by appropriate regulations such as IEC 61000-3-2. When a lighting arrangement according to the invention is connected to a DC power supply such as a photovoltaic system, the SMPS driver can adjust its input power consumption to an appropriate target value. Such a driver is also capable of adjusting its output power delivery over time so that the total light output of the system complies with mains-related requirements such as modulation depth. An SMPS driver can also adjust its input-to-output signal conversion in order to balance the overall system performance.

Also, as already indicated, the second power converter can be realized to simply provide additional power as needed, so that the total system (comprising driving arrangement and lighting load) can operate at a higher power level than could be achieved by the first power converter alone. Furthermore, since the first power converter can perform any necessary functions such as conforming to regulations, adjusting output power, etc., in a preferred embodiment of the invention the second power converter comprises a simple linear driver. Such a driver is generally characterized by a low power factor and would not be suitable on its own for driving a lighting load such as an LED arrangement, and may not even be approved for such use. The linear driver does not need to be able to perform the complex tasks mentioned above, since these are all dealt with by the first power converter. According to the invention, the driver arrangement effectively allows for a combination of power converters, for example one with a power factor close to unity and one with a low power factor, to achieve a significant range of power levels. From a small set of available driver stages, a large range can be 'mixed'. For example, from the set of driver stages comprising 10.0 W and 20.0 W SMPS drivers; and 2.0 W, 5.0 W and 7.0 W linear drivers, it is possible to build drivers for 12, 15, 17, 22, 25 and 27 W lamps using an SMPS driver in conjunction with a linear driver (in addition to the 10 W and 20 W designs that use only an SMPS driver). Of course, any number of linear drivers can be deployed in a design, depending on the required power factor of the lamp. For example, a 24 W lamp can be powered from a 10.0 W SMPS driver in conjunction with two 7.0 W linear drivers.

The monitoring unit can be realized to monitor any appropriate operating characteristic. For example, the monitoring unit could provide information about a relevant current waveform, an output characteristic such as a power level delivered to the lighting load, etc. In a preferred embodiment of the invention, the monitoring unit is realized to monitor an input current of the second power converter. The information already available to the first power converter together with the feedback supplied by the monitoring unit means that the first power converter is informed of a total input and/or output of the driver arrangement. The monitoring unit can comprise a means for measuring a signal directly, for example a resistor that can "measure" current by the voltage drop over the resistor. Equally, the monitoring unit can derive information from related signals, for example a setpoint command and a control loop error signal. Any number of monitoring units can be used in the driving arrangement according to the invention, depending on a desired degree of controllability and/or accuracy.

The first power converter can respond to the feedback in an appropriate manner. In a preferred embodiment of the invention, the feedback delivered by the monitoring unit regulates the input power of the first power converter. In this way, the behavior of the first power converter is controlled on the basis of the operating characteristic monitored by the monitoring unit.

As indicated above, the first power converter essentially acts as a "main driver" and takes care of all relevant functions such as compliance with regulations, etc., and the second power converter is essentially an "auxiliary driver". In one preferred embodiment of the invention, therefore, the lighting load can be driven primarily by the first power converter, and the second power converter is preferably activated on the basis of a performance parameter of the lighting load. For example, since the light output of an LED decreases with increasing temperature, the second power converter may be activated in response to a detected temperature increase. Similarly, since the light output of an LED decreases over its lifetime, the second power converter may be activated after a predefined operating time of the LEDs is reached.

In a preferred embodiment of the invention, the lighting load comprises a first LED string arranged to be driven by the first power converter only, and a second LED string arranged to be driven by the second power converter in conjunction with the first power converter. In this embodiment, the monitoring unit can comprise a means for measuring the input current of the second driver. This can be used to regulate the input power of the first driver. Such a realization is associated with a favorably straightforward design of the two driver stages. Furthermore, since the second LED string or light engine is driven by both drivers, relatively little effort must be expended to obtain a satisfactory mixing of the light output by both light engines.

In an alternative embodiment of the invention, the lighting load comprises a single LED string or light engine arranged to be driven by the second power converter in conjunction with the first power converter, i.e. both drivers drive all LEDs of the single LED engine. The first driver in this case can also be an SMPS driver such as a boost converter. However, this embodiment should preferably comprise a means for limiting the supply voltage to the first driver during intervals in which the supply voltage is higher than the intended output voltage of the first driver. This can be achieved by using an appropriate semiconductor switch such as a MOSFET. With such an input regulating means, the boost converter cannot draw input current all the time, so that the power factor is lowered somewhat. However, the lower power factor may be weighed against the advantage of being able to use a single LED string or light engine, which will always provide a homogenous light output, and there is no need to invest any effort in mixing light from different light engines.

In another alternative embodiment of the invention, the lighting load comprises a first LED string that is arranged to be driven by the first power converter only, and a second LED string that is arranged to be driven by the second power converter only, with a monitoring unit for driving the first power converter as described above. The advantage of such a design (with distinct first and second modules) is that a wide choice of driver designs is available for the first and second power converters. Furthermore, high-voltage and low-voltage LEDs can be combined in a single lighting arrangement. For example, a first module might comprise an SMPS driver and a first LED load in a well-defined or standardized module. A second module with linear driver and second LED load can then be chosen on the basis of lowest cost. While this realization is straightforward from an electrical point of view, some design effort may be required to mix the light output from both light engines.

Alternatively, in another embodiment of the invention, the LEDs of the first LED string are interleaved with the LEDs of the second LED string. In this way, the light delivered by the overall LED arrangement is always favorably homogenous. This can be particularly favorable when the first and second power converters drive separate or distinct LED strings, since the LEDs of the separate strings might have noticeably different light output levels. By interleaving the LEDs of the LED strings, any such difference in light output levels is effectively hidden.

In a particularly preferred embodiment of the invention, the lighting arrangement is realized as a tube LED, i.e. as a retro-fit application in which energy-efficient LEDs are used to replace a fluorescent light source. Here, the long tube is fitted with one or more LED strings. Since the driver arrangement according to the invention can be realized in a very compact manner, the components of the driver arrangement can fit into one or both tube ends, so that essentially the entire light-transmissive part of the tube can be used for illumination, i.e. there are essentially no unfavorable "dark ends" between the light-emitting elements and the tube ends. In a tube LED application, the diameter of the existing tube is a key limiting factor. However, as mentioned above, the physical size of the magnetic component of an SMPS driver is related to the power level. Beyond a certain power level, therefore, the magnetic component might not fit within the allowed diameter of the tube. In prior art solutions, this situation is dealt with by splitting the magnetic component so that two smaller parts can be used instead. However, this increases the overall cost and also increases the total length of the driver, leaving less room for the LED light sources in the tube, with the result that the undesirable "dark ends" tend to be more prominent in prior art tube LEDs.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
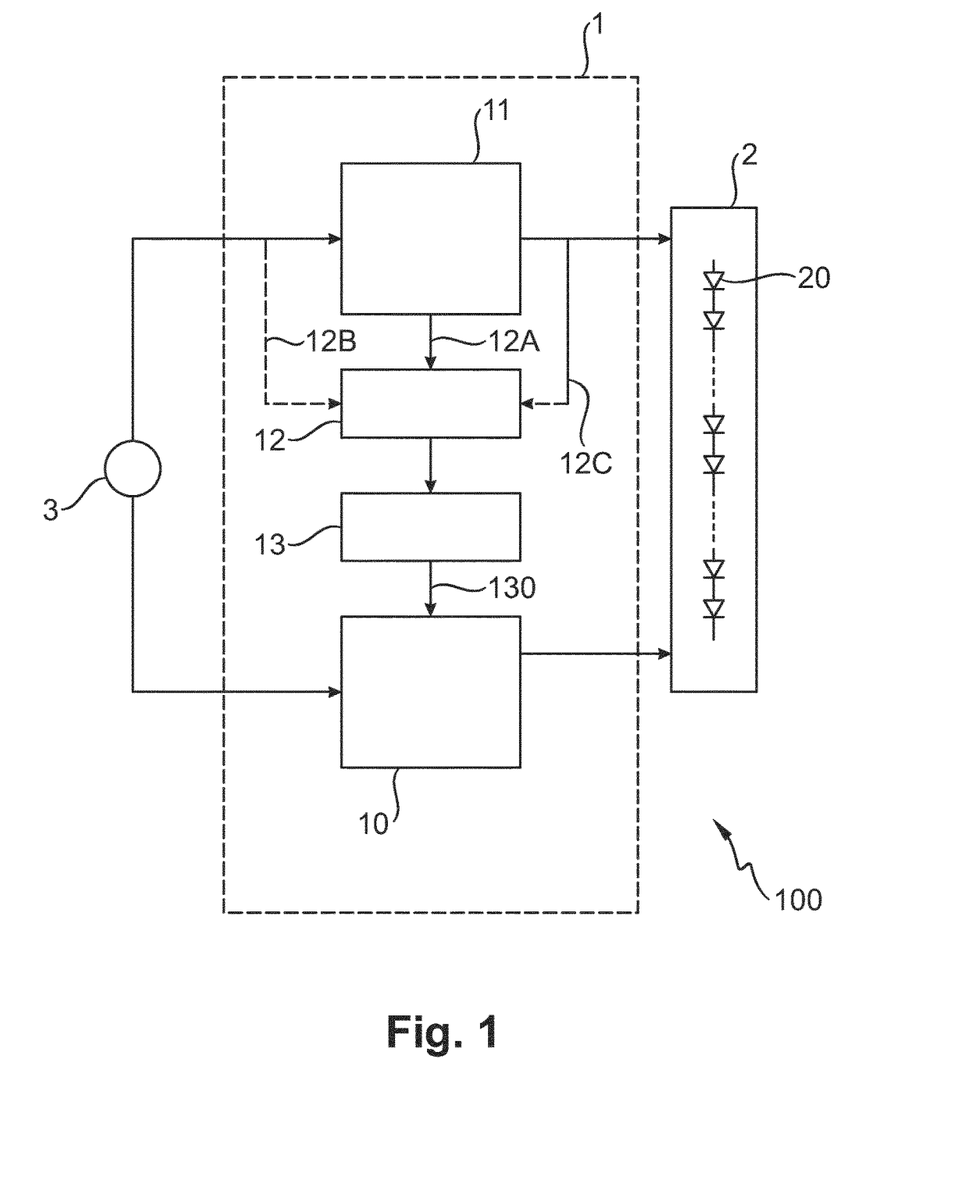
FIG. 1 shows a block diagram of a lighting arrangement according to a first embodiment of the invention.

FIG. 1 shows a block diagram of a lighting arrangement 100 according to a first embodiment of the invention. The lighting arrangement 100 comprises a semiconductor lighting load 2, in this case one or more strings of LEDs 20. The lighting arrangement 100 is connected to a power supply 3, for example a mains supply, a DC power supply, etc. The lighting arrangement 100 comprises a driving arrangement 1 according to the invention, with a first power converter 10, a second power converter 11, a monitoring unit 12, and a control signal generator 13. The first power converter 10 is a highly-controllable power supply such as an SMPS power supply, and has a high power factor close to unity. The second power converter 11 is relatively simple, and can be a linear power supply with a significantly lower power factor, and may even be a driver which would otherwise not be approved for use on its own in such a lighting arrangement 100. During operation of the lighting arrangement 100, the monitoring unit 12 monitors one or more operating parameters 12A, 12B, 12C. An operating parameter 12A can relate to an internal signal of the second power converter 11. Further operating parameter(s) 12B, 12C may relate to an input power signal 12B and/or an output signal 12C of the second power converter 11. The control signal generator 13 uses information provided by the monitoring unit 12 to generate an output control signal 130 which is used to control the performance of the first power converter 10. Of course, although not shown in this diagram for the sake of clarity, the control signal generator 13 could also be supplied with monitored operating parameters of the first power converter 10 so that it can take internal, input and output characteristics of first power converter 10 into account.

The lighting load 2 can comprise a single LED arrangement driven by both power converters 10, 11. Equally, it may be divided into two or more LED arrangements that are driven separately or together by the power converters 10, 11, as will be explained below.

Figure 2:
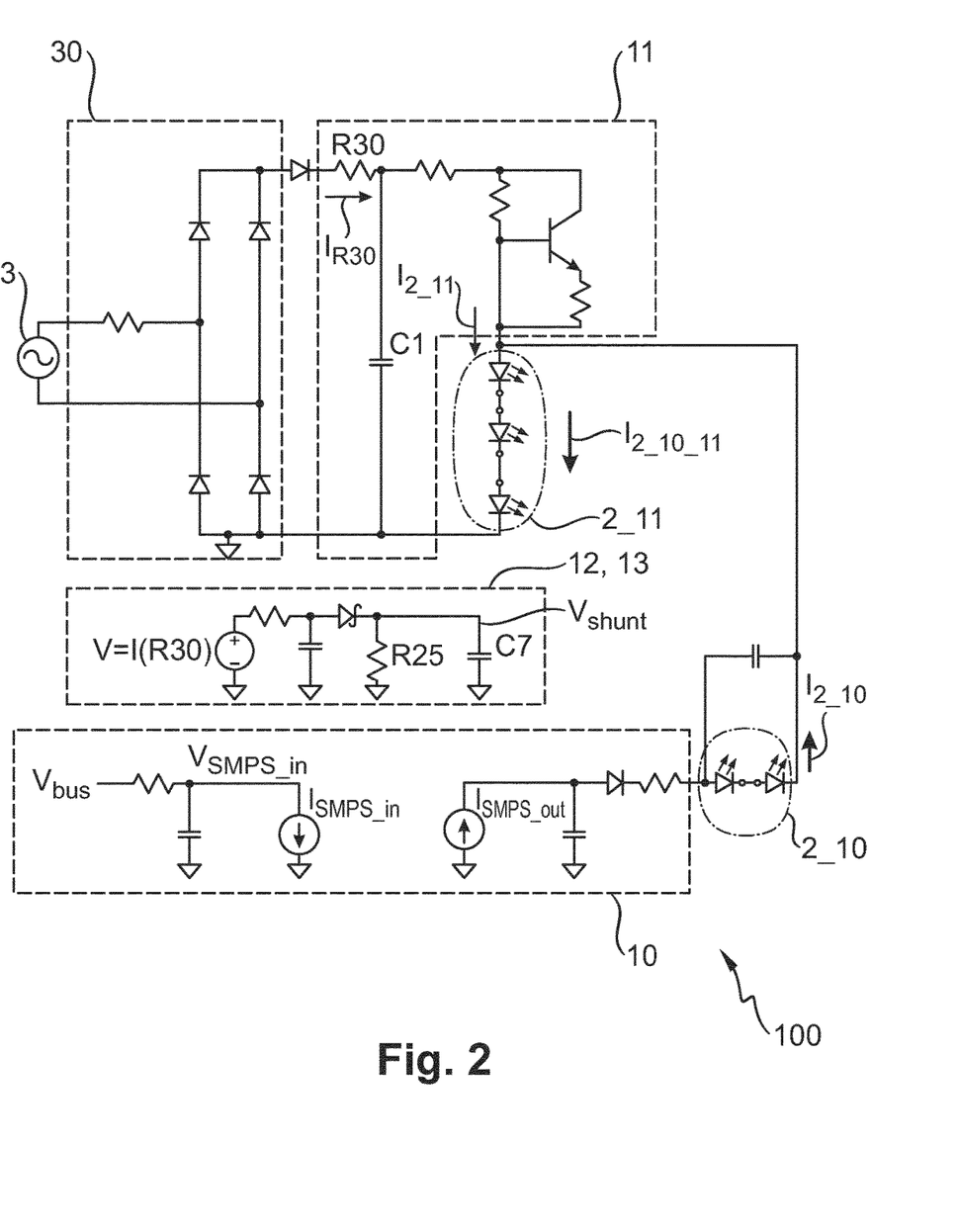
FIG. 2 shows a simplified circuit diagram of a first embodiment of a lighting arrangement according to the invention.

FIG. 2 shows a first embodiment of the driver arrangement 1 according to the invention in a simplified circuit diagram. For the sake of clarity, not all connections are shown in the diagram for reasons which will be understood by the skilled person. A power supply 3 and a rectification stage 30 supplies an input voltage $V_{bus}$ to each driver 10, 11. The first power converter 10 is an SMPS power supply 10, represented here as a boost converter 10 with a power intake stage SMPS_in and a boosted output signal SMPS_out. The second power converter 11 is a linear driver 11 and drives a second LED string 2_11, while the SMPS power supply 10 drives a first LED string 2_10 as well as the second LED string 2_11, so that a first current $I_{2\_10}$ flows through the first LED string 2_10 and a second current $I_{2\_11}$ flows through the second LED string 2_11. Here, the monitoring unit 12 and control signal generating unit 13 are a combined unit realized to measure the input current $I_{R30}$ drawn by the linear driver 11 and to generate a signal $V_{shunt}$ that is used to limit the input power of the SMPS power converter 10. Therefore, the input current of the SMPS driver 10 is shaped also according to the current drawn by the second driver 11. The monitored input current $I_{R30}$ therefore corresponds to the monitoring unit input signal 12A of FIG. 1, while the control signal $V_{shunt}$ corresponds to the output signal 130 of the control signal generating unit 13 as indicated in FIG. 1. The monitored input current $I_{R30}$ can be measured using suitable circuitry such as a current mirror as will be known to the skilled person. Alternatively, the current measurement node in the second driver and the reference potential of the first driver can be chosen such that the input current information of the second driver is available to the first driver without requiring a current mirror. For example, the current in the return path can be measured. This current is the sum of the first driver's input current and the second driver's output current. Since the first driver may know its own output current, calculating the input current contribution (e.g. using simple analogue addition or subtraction circuitry) may be more straightforward and cost-effective than a current mirror. In such an embodiment, the analogue addition/subtraction circuit could act as control signal generation unit.

In this embodiment, the linear driver 11 comprises a capacitor C1 which is charged around peak mains voltage and which discharges over the LED string 2_11, thereby achieving a high light output of the LEDs of the second string 2_11. The effect of the capacitor C1 on the light output of the second string 2_11 is emulated by the combination of resistor R25 and capacitor C7, so that the SMPS driver 10 obtains information about the performance of the linear driver 11, and can adjust its input current accordingly. Therefore, the monitoring unit 12 and control signal generating unit 13 in this embodiment effectively take both input and output characteristics of the second driver 11 into account.

Generally, the components of the monitoring unit 12 and control signal generating unit 13 can be "tuned" according to the choice of first power converter 10 and second power converter 11, and according to required or desired performance of the lighting arrangement. This applies to all embodiments of the lighting arrangement 100 described herein.

Figure 3:
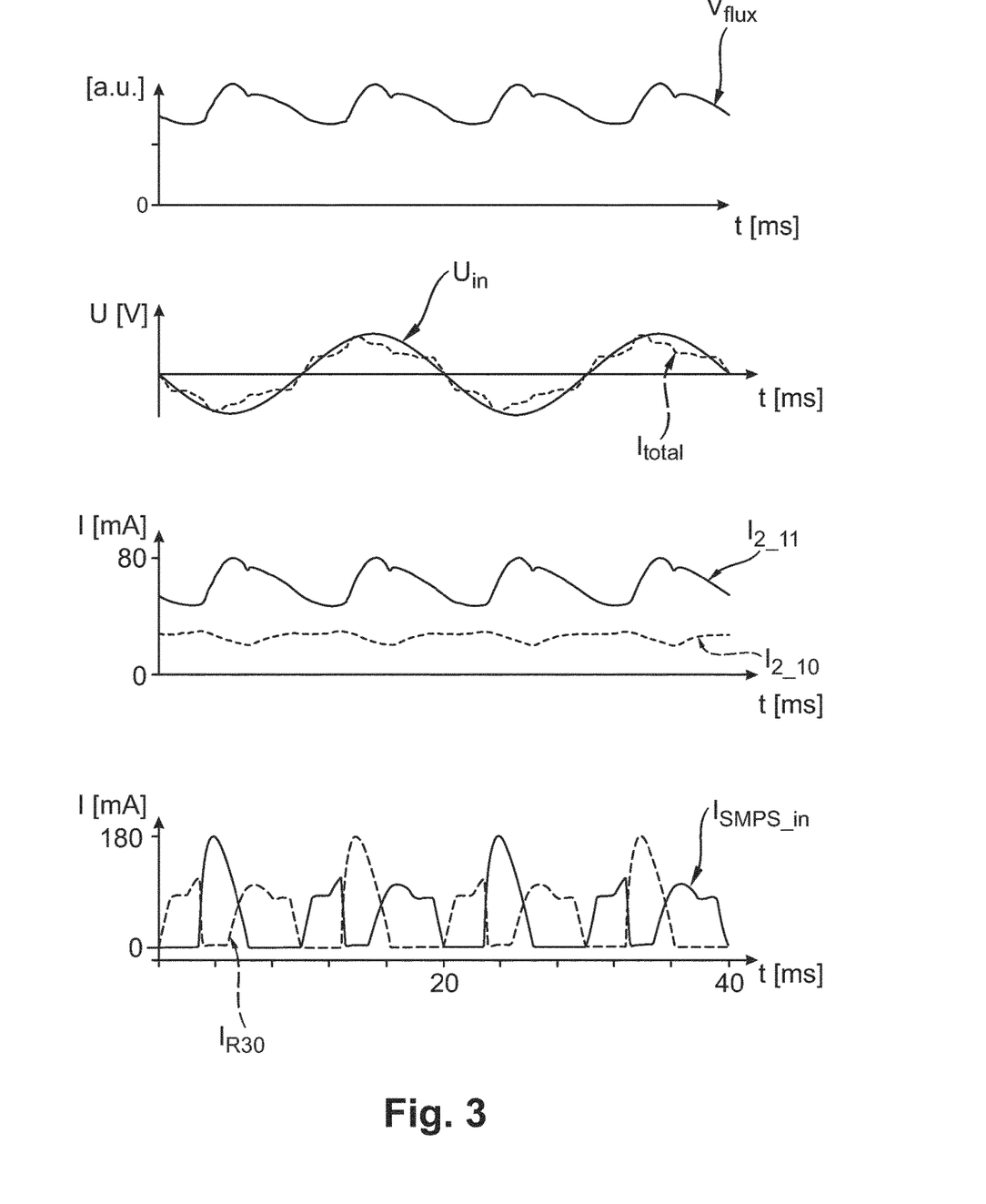
FIG. 3 shows exemplary current and voltage waveforms for the circuit of FIG. 2.

FIG. 3 shows exemplary current and voltage waveforms for the circuit of FIG. 2. Starting at the bottom of the diagram, the first part shows that the linear driver input current $I_{R30}$ exhibits a series of pulses owing to the recharging of the capacitor C1 around the peak of the mains voltage. The SMPS driver input current $I_{SMPS\_in}$ is reduced during input intervals of the linear driver input current IR30.

The SMPS driver 10 outputs an LED current $I\_2\_10$ for the LEDs of the first string 2_10; and the linear driver 11 outputs an LED current $I\_2\_11$ for the second string 2_11, as shown in the second part of the diagram. However, since the LED current $I\_2\_10$ from the SMPS driver 10 is also fed to the second string 2_11, the light output of the second string 2_11 can be greater than that of the first string 2_10 in the case of identical LED strings 2_10, 2_11. To obtain a homogenous light output, the strings 2_10, 2_11 can be balanced by using appropriate combinations of LED type and number. Alternatively, in a more straightforward and less costly approach, the LEDs of the two strings 2_10, 2_11 can simply be interleaved to mix the light from the two strings 2_10, 2_11.

The third part of the diagram shows the mains input $U_{in}$ and the total input current $I_{total}$, whose shape approaches a sinusoidal shape even though the output of the linear driver 11 is quite 'peaky'.

The output of the SMPS driver 10 is coupled to its input, and can have an efficiency exceeding 90%. The total input current $I_{total}$ can have a favorably high power factor of about 0.97. In this embodiment, the total flux is characterized by a low level of flicker, as indicated in the top part of the diagram, where total light flux is plotted in arbitrary units. The excellent regulation performance of the SMPS driver 10 compensates for the poor input power quality and flicker characteristics of the simple linear driver 11, so that the overall performance and flicker index of the lighting arrangement 100 is satisfactory. In the example given above, the total flicker index—i.e. the relative amount of light above the average light output—will not exceed 6%, which is a favorably low level for a lighting application.

Figure 4:
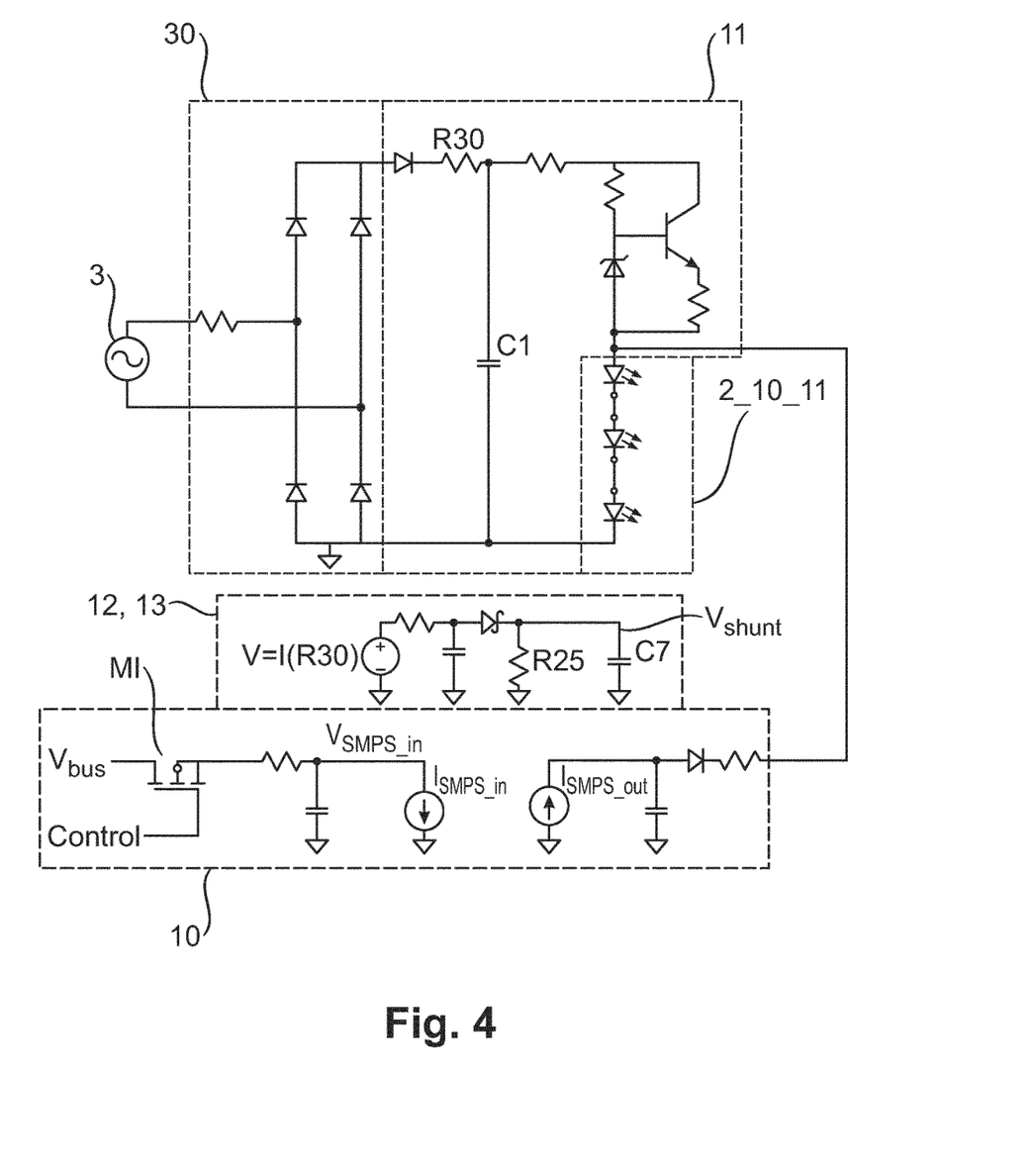
FIG. 4 shows a simplified circuit diagram of a second embodiment of a lighting arrangement according to the invention.

FIG. 4 shows a second embodiment of a lighting arrangement 100 according to the invention. Here, a single LED string 2_10_11 is driven by both drivers 10, 11 as a combined load. The diagram shows the first driver 10 connected to the beginning of the LED string 2_10_11, but of course it could be connected to any point along the LED string 2_10_11 between two consecutive LEDs. In this embodiment also, the first power converter 10 can be a boost driver 10, in which case the supply to the power converter 10 should be suppressed during the intervals in which the supply voltage $V_{bus}$ is higher than the intended output voltage. To this end, a transistor switch M1 such as a MOSFET is used in this embodiment, and can be controlled by the control signal generating unit 13. The effect of this intermittent suppression, namely preventing the boost converter 10 from continuously drawing input current, lessens the power factor of the first driver 10. In this embodiment, the power factor is lowered to about 0.86-0.9. However, in some applications, this side-effect can be regarded as minor compared to the advantages of being able to use a single LED string 2_10_11 and not having to take any steps to mix the light from two strings. In this embodiment, if the linear driver 11 has a well-defined input-to-output ratio that is known to the SMPS driver 10, the SMPS driver 10 can detect a distortion (caused by the linear driver 11) on its own output. For example, the SMPS driver 10 can detect a voltage increase across the LED string 2_10_11 caused by the linear driver 11, estimate the associated current delivered by the linear driver 11, and can adjust its own input current wave shape to compensate. This 'coupling' between SMPS driver 10 and linear driver 11 is indirect, i.e. it takes place only over the load 2_10_11, i.e. by sensing a load-related signal, so that the monitoring unit and control signal generation unit in this case are realized as part of the SMPS driver 10.

Figure 5:
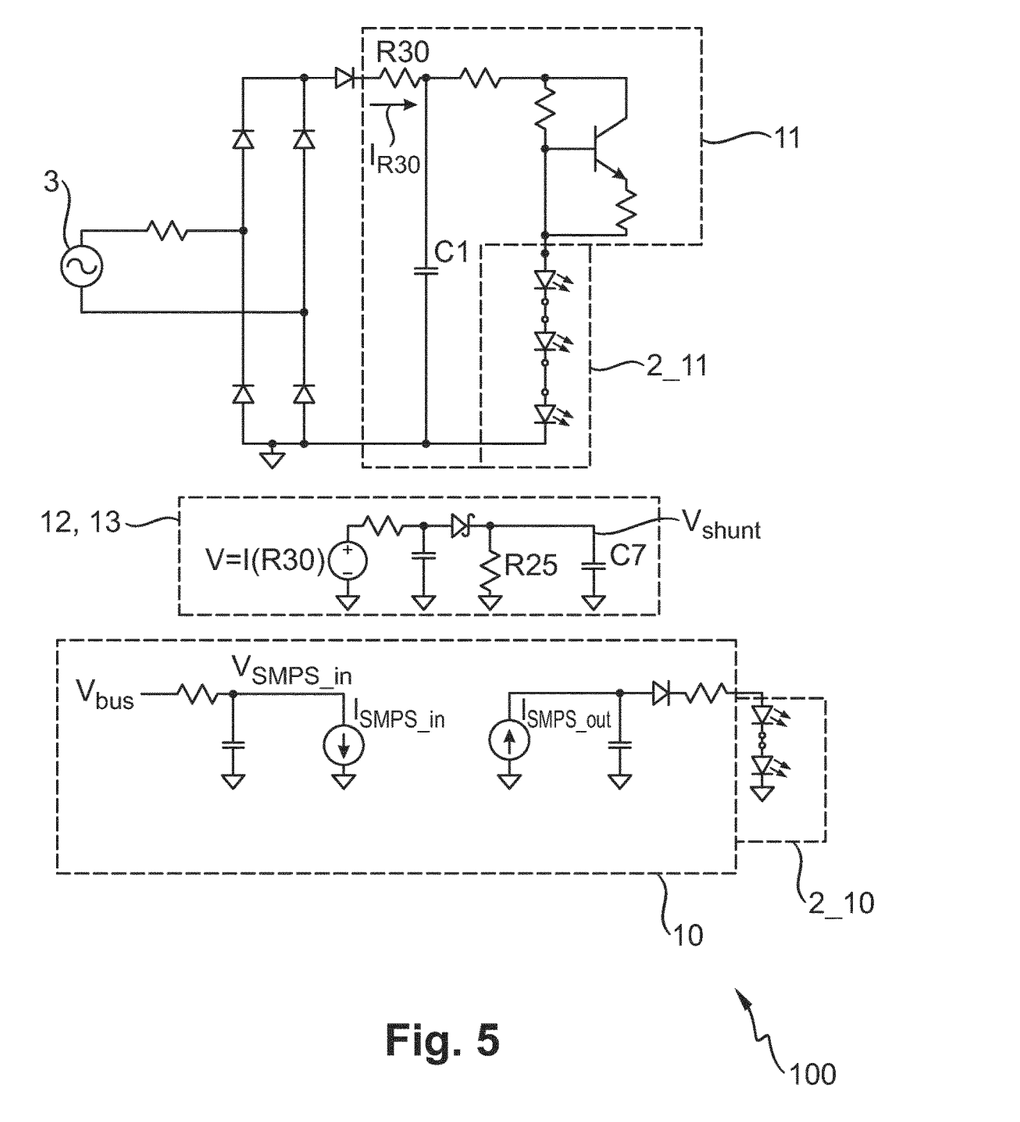
FIG. 5 shows a simplified circuit diagram of a third embodiment of a lighting arrangement according to the invention.

FIG. 5 shows a third embodiment of a lighting arrangement 100 according to the invention. Here, each driver 10, 11 drives its own separate LED string 2_10, 2_11. In this embodiment also, the first power converter can be an SMPS driver 10 and the second power converter can be a simple linear driver 11. This embodiment is particularly advantageous from the point of view of being able to use any of a wide variety of driver topologies. Furthermore, the LED strings 2_10, 2_11 can be different too, for example a high-voltage LED string 2_11 can be driven by the second power converter 11, and a low-voltage LED string 2_10 can be driven by the first power converter 10. As indicated above, the light from the two different strings can be mixed by interleaving the LEDs of the two strings 2_10, 2_11 in order to obtain a homogenous light output. Such an embodiment can make use of a well-defined module based on an off-the-shelf 10W SMPS driver for which access to the control circuitry is possible, allowing control of the SMPS driver 10 using an output of the control signal generator 13. The second driver 11 and its LED string 2_11 can be chosen on the basis of lowest cost. This demonstrates the high degree of scalability of the driver arrangement 1 and lighting arrangement 100 according to the invention.

Figure 6:
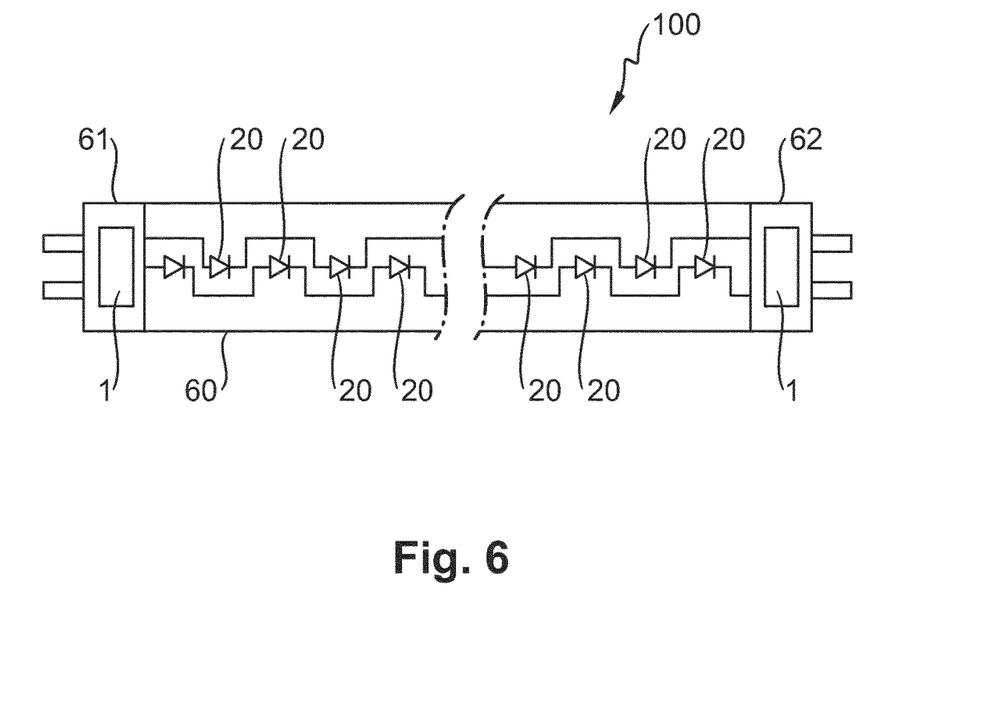
FIG. 6 is a schematic rendering of a retrofitted tube LED as a lighting arrangement according to the invention.

FIG. 6 is a schematic rendering of a retrofitted tube LED 100 or "TLED" 100. A tubular housing 60 and end pieces 61, 62 correspond to those of a standard fluorescent lamp. Here, two strings of LEDs 2_10, 2_11 are arranged along the length of the tubular housing 60. The driving arrangement 1 comprising SMPS driver, linear driver, monitoring unit etc., can be any of the embodiments as described in the preceding drawings. The driving arrangement 1 is distributed within one or both end pieces 61, 62, leaving essentially the entire transparent housing 60 to the LED strings 2_10, 2_11. In this way, such a retro-fitted luminaire 100 is characterized by favorably short "dark ends". To ensure a homogenous light output, the LEDs 20 of the LED strings 2_10, 2_11 are interleaved. For example, alternate LEDs 20 belong to one LED string. Of course, any interleaving pattern can be chosen.

Alternatively, instead of splitting the driver arrangement and arranging separate parts in the tube ends 61, 62, components of the linear driver can be arranged along the length of the tube. This is possible for a linear driver that does not need a bulky magnetic component. Such an arrangement frees up more space in the tube ends 61, 62 for the first driver 10, resulting in even shorter dark ends. Besides the advantage of very short dark ends, the driving arrangement according to the invention also allows driver-related heat dissipation to be distributed along the length of the tube, rather than concentrating it in the tube ends.

Figure 7:
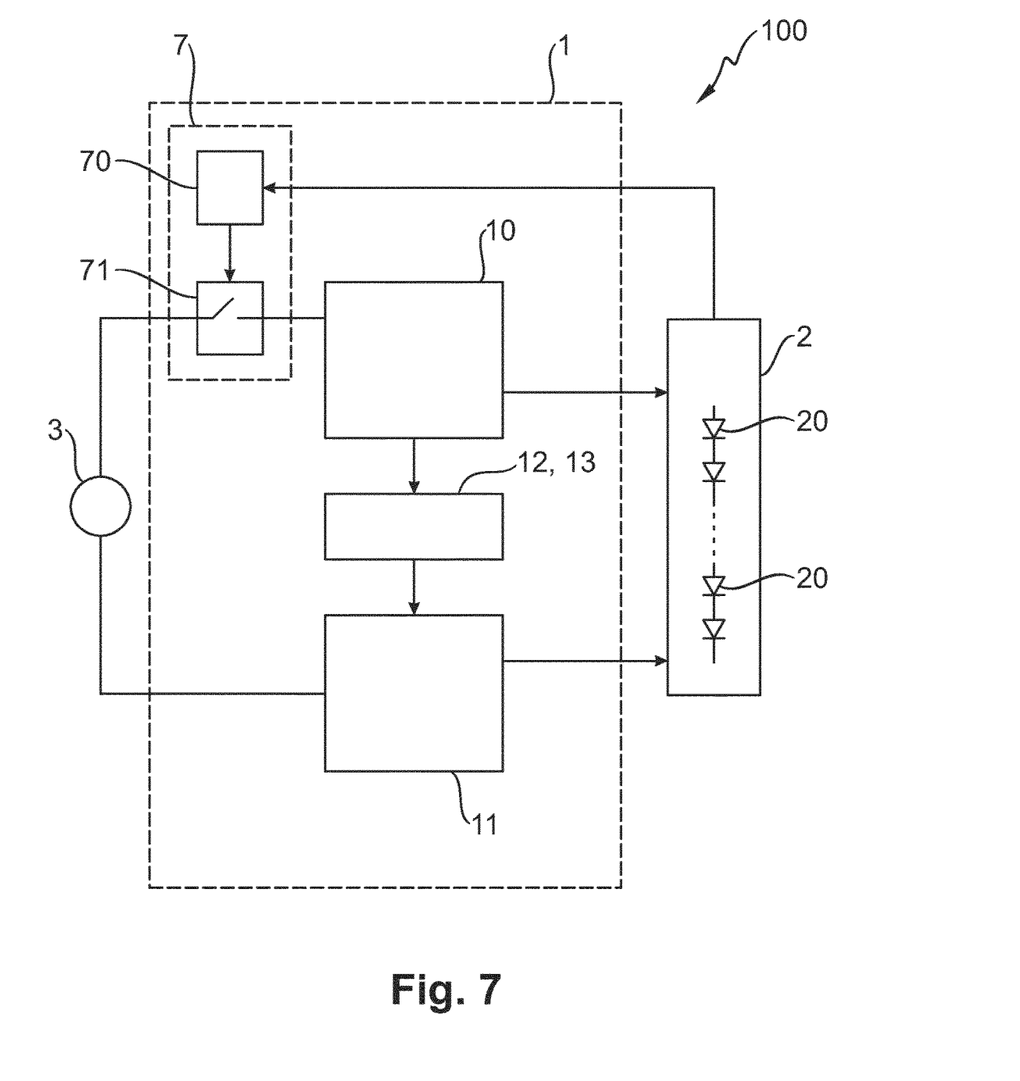
FIG. 7 shows a block diagram of an embodiment of the driver arrangement according to the invention.

FIG. 7 shows an embodiment of the driver arrangement 1 according to the invention, with an activating means 7 for activating the second power converter 11. The activating means 7 in this embodiment is based on the relationship between LED light output and temperature. As the pad temperature of an LED arrangement increases, the LED performance is adversely affected, and the light output drops accordingly. To detect this, the driver arrangement comprises a temperature sensor 70. As long as the pad temperature of the lighting load 2 is below a threshold level, the first driver 10 performs in a stand-alone manner and the second driver 11 is inactive or disabled. When the temperature sensor 70 indicates that a temperature threshold has been exceeded, the activating means 7 enables the second driver 11, for example by closing a switch 71 between power supply 3 and second driver 11. The second driver 11 now augments the first driver 10 to increase the current through the LEDs 20, so that the light output of the LED arrangement 2 remains constant even at higher temperatures. In an alternative embodiment, the activating means 7 could be realized to activate the second driver 11 after a certain portion of the LED lifetime has elapsed, since the light output of an LED is known to deteriorate slightly as the LED ages. Of course, instead of using a sensor to detect such an event, the activation means 7 could comprise a switch that is manually actuated as desired.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A driver arrangement suitable for driving a semiconductor lighting load comprising a number of LEDs, the driver arrangement comprising
    a first power converter configured to supply at least a first portion of an input power to the lighting load;
    a second power converter configured to supply at least a second portion of the input power to the lighting load;
    the first power converter being more power-efficient and more controllable than the second power converter
    wherein the first and second power converters are each
        directly connected to an output of a rectifier stage,
        wherein the rectifier stage is connected to a power supply;

a monitoring arrangement configured to monitor an operating characteristic of the second power converter; and a control signal generator configured to generate a control signal for the first power converter on the basis of the monitored operating characteristic, wherein, the first power converter is configured to drive at least a first portion of the lighting load, and the second power converter is configured to drive a second portion of the lighting load.

2. The driver arrangement according to claim 1, wherein the first power converter comprises a switched-mode power supply.

3. The driver arrangement according to claim 1, wherein the second power converter comprises a linear driver.

4. The driver arrangement according to claim 1, wherein the monitoring unit is configured to monitor an input current of the second power converter.

5. The driver arrangement according to claim 1, wherein the monitoring unit is configured to regulate the input power of the first power converter.

6. The driver arrangement according to claim 1, wherein the first power converter is configured to drive the second lighting load portion in conjunction with the second power converter.

7. The driver arrangement according to claim 6, comprising a means for limiting the supply voltage to the first power converter.

8. The driver arrangement according to claim 1, comprising an activating means for activating the second power converter on the basis of a performance parameter of the semiconductor lighting load.

9. A lighting arrangement, which lighting arrangement comprises a semiconductor lighting load; and a driver arrangement according to claim 1 for driving the semiconductor lighting load.

10. The lighting arrangement according to claim 9, comprising at least two lighting load portions comprising LEDs and wherein the LEDs of a first lighting load portion are interleaved with the LEDs of a second lighting load portion.

11. The lighting arrangement according to claim 9, wherein the lighting arrangement is realized as a tube LED lighting arrangement.

12. The driver arrangement according to claim 1, further comprising:

an activating means for activating the second power converter; and a temperature sensor, wherein the activating means activates the second power converter when a temperature threshold has been exceeded.

13. The driver arrangement according to claim 1, further comprising:

an activating means for activating the second power converter after a certain portion of a lifetime of the lighting load has elapsed.

14. A method of driving a semiconductor lighting load, which method comprises the steps of arranging a first power converter to supply at least a first portion of an input power to the lighting load;

arranging a second power converter to supply at least a second portion of the input power to the lighting load, wherein the first and second power converters are each directly connected to an output of a rectifier stage, wherein the rectifier stage is connected to a power supply;

monitoring an operating characteristic of the second power converter; and generating a control signal for the first power converter on the basis of a monitored operating characteristic, wherein, the first power converter is configured to drive at least a first portion of the lighting load; and the second power converter is configured to drive a second portion of the lighting load.

* * * * *